(12) United States Patent
Bowen (10) Patent No.: US 6,427,550 B1
(45) Date of Patent: Aug. 6, 2002

(54) TWIN CLUTCH AUTOMATED TRANSAXLE

(75) Inventor: Thomas C. Bowen, Rochester Hills, MI (US)

(73) Assignee: New Venture Gear, Inc., Troy, MI (US)

( * ) Notice: Subject to any disclaimer, the term of this patent is extended or adjusted under 35 U.S.C. 154(b) by 14 days.

(21) Appl. No.: 09/759,768

(22) Filed: Jan. 12, 2001

(51) Int. Cl.[7] .............................................. F16H 59/00
(52) U.S. Cl. ........................ 74/336 R; 74/339; 74/331
(58) Field of Search ............................ 74/731.1, 732.1, 74/331, 335, 336 R, 339, 733.1

(56) References Cited

U.S. PATENT DOCUMENTS

| | | | |
|---|---|---|---|
| 4,517,859 A | * 5/1985 | Nagaoka et al. | 74/336 R |
| 4,632,234 A | * 12/1986 | Bardoll et al. | 192/3.58 |
| 5,711,409 A | * 1/1998 | Murata | 74/336 R |
| 5,890,392 A | 4/1999 | Ludanek et al. | 74/331 |
| 5,966,989 A | 10/1999 | Reed, Jr. et al. | 74/331 |
| 6,209,406 B1 | 4/2001 | Sperber et al. | 74/331 |
| 6,209,407 B1 | 4/2001 | Sperber et al. | 74/330 |

* cited by examiner

Primary Examiner—Paul N Dickson
Assistant Examiner—Thomas J. Williams
(74) Attorney, Agent, or Firm—Harness, Dickey & Pierce P.L.C.

(57) ABSTRACT

An automated twin-clutch multi-speed transmission adapted to transfer power from the engine to one or more drivelines of a motor vehicle. The transmission includes a first engine clutch establishing a releasable drive connection between the engine and a first input shaft, a second engine clutch establishing a releasable drive connection between the engine and a second input shaft, an output shaft connected to the driveline, and power-operated dog clutches for selectively engaging constant-mesh gearsets. A transmission controller coordinates actuation of the first and second engine clutches and the power-operated dog clutches to permit non-power interrupted ("powershift") sequential gear changes automatically without input from the vehicle operator.

18 Claims, 5 Drawing Sheets

TWIN CLUTCH AUTOMATED TRANSAXLE

FIELD OF THE INVENTION

The present invention relates generally to transmissions for use in motor vehicles and, more particularly, to a twin-clutch automated transmission applicable for use in front-wheel drive and rear-wheel drive vehicles.

BACKGROUND OF THE INVENTION

Automobile manufacturers continuously strive to improve fuel efficiency. This effort to improve fuel efficiency, however, is typically offset by the need to provide enhanced comfort and convenience to the vehicle operator. For example, it is well known that manual transmissions are more fuel efficient than automatic transmissions, yet a majority of all passenger vehicles are equipped with automatic transmissions due to the increased convenience they provide.

More recently, "automated" variants of conventional manual transmissions have been developed which shift automatically without any input from the vehicle operator. Such automated transmissions typically include a plurality of power-operated actuators that are controlled by a transmission controller to shift traditional synchronized dog clutches. However, such automated transmissions have the disadvantage that there is a power interruption in the drive connection between the input shaft and the output shaft during sequential gear shifting. Power interrupted shifting results in a harsh shift feel which is generally considered to be unacceptable when compared to smooth shift feel associated with most automatic transmissions. To overcome this problem, automated twin-clutch transmissions have been developed which can be powershifted to permit gearshifts to be made under load. Examples of such automated manual transmissions are shown in U.S. Pat. Nos. 5,966,989 and 5,890,392. While such powershift twin-clutch transmissions overcome several drawbacks associated with conventional single-clutch automated transmissions, a need exists to develop simpler and more robust transmissions which advance the automotive transmission technology.

SUMMARY OF THE INVENTION

Accordingly, it is an object of the present invention to provide a twin-clutch transmission and a control system for permitting automatic shifting of the twin-clutch transmission.

As a related object, the twin-clutch automated transmission of the present invention has a compact split-path geartrain applicable for use as a transaxle in front-wheel drive vehicles.

As a further object, the twin-clutch automated transmission of the present invention is also applicable for use in rear-wheel drive vehicles.

These and other objects of the present invention are met by providing an automated twin-clutch multi-speed transmission adapted to transfer power from the engine to one or more drivelines of a motor vehicle. The transmission includes a first engine clutch operable to establish a releasable drive connection between the engine and a first input shaft, a second engine clutch operable to establish a releasable drive connection between the engine and a second input shaft, an output shaft adapted to transfer power to the driveline, and a geartrain for selectively establishing a plurality of forward and reverse speed ratio drive connections between the input shafts and the output shaft. The transmission further includes power-operated dog clutches for selectively engaging constant-mesh gearsets associated with the geartrain, and a transmission controller for controlling coordinated actuation of the first and second engine clutches and the power-operated dog clutches to permit non-power interrupted ("powershift") sequential gear changes automatically without input from the vehicle operator. A clutch control system includes a first hydraulic pump driven by the first input shaft for delivering high-pressure fluid to a first control valve associated with the first engine clutch, a second hydraulic pump driven by the second input shaft for delivering high-pressure fluid to a second control valve associated with the second engine clutch, and flow control valving for controlling fluid flow between the first and second pumps. When shifting under power between gear ratios, one engine clutch is released such that the pump associated with the driven input shaft supplies fluid to the pump associated with released input shaft for causing acceleration/deceleration of the released input shaft into synchronization with the output shaft. Following completion of speed synchronization, the dog clutch for the selected gearset on the released input shaft is actuated and thereafter the released engine clutch is re-engaged and the engaged engine clutch is released.

In accordance with an alternative arrangement, the clutch control system can include a single control valve in conjunction with an engine clutch assembly operable for selectively establishing drive connections between the engine and each of the first and second input shafts.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the scope of this invention will become apparent to those skilled in the art.

DETAILED DESCRIPTION OF THE PREFERRED EMBODIMENTS

Figure 1:
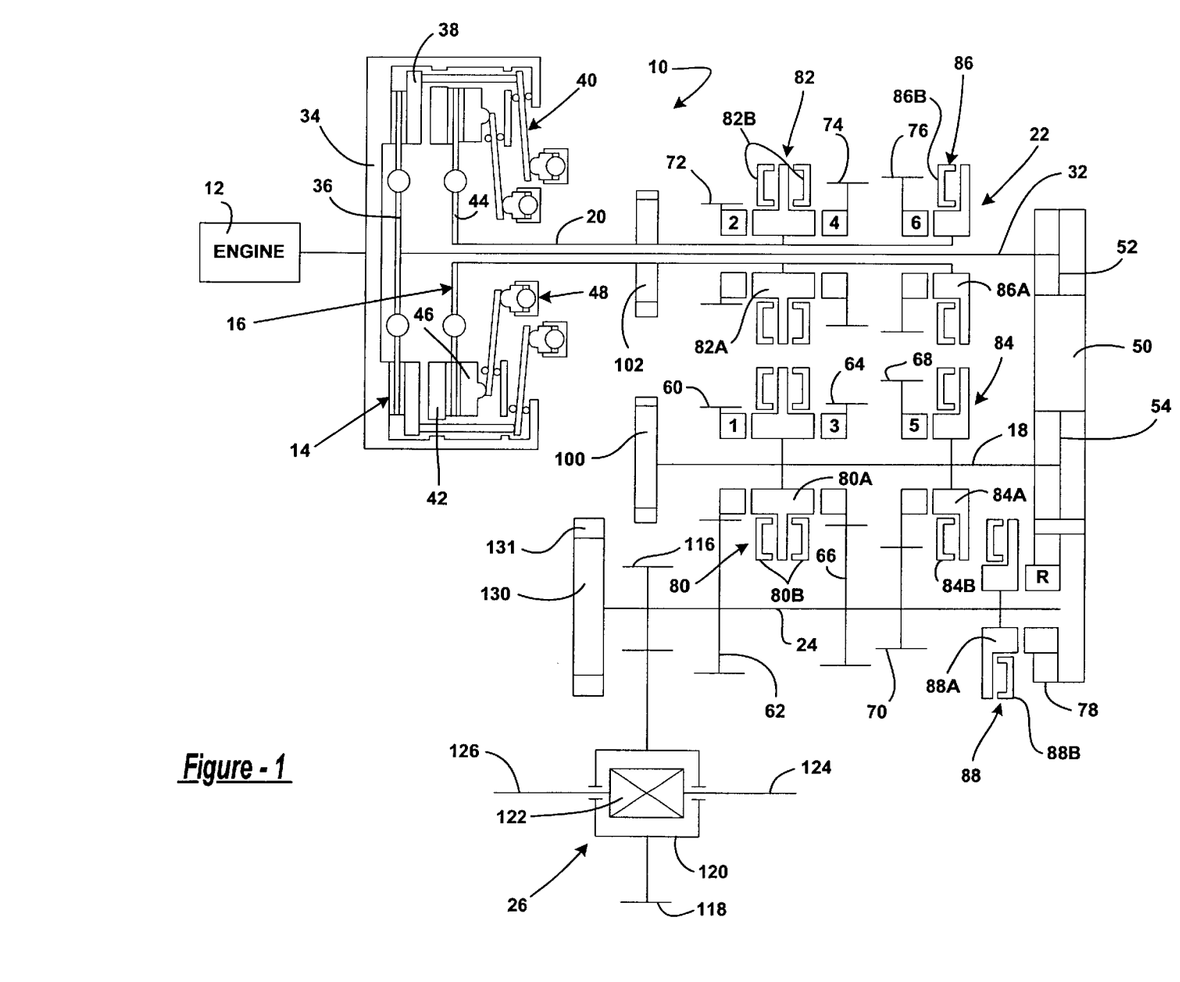
FIG. 1 is a schematic view of a twin-clutch automated transmission according to the principles of the present invention.
Figure 2:
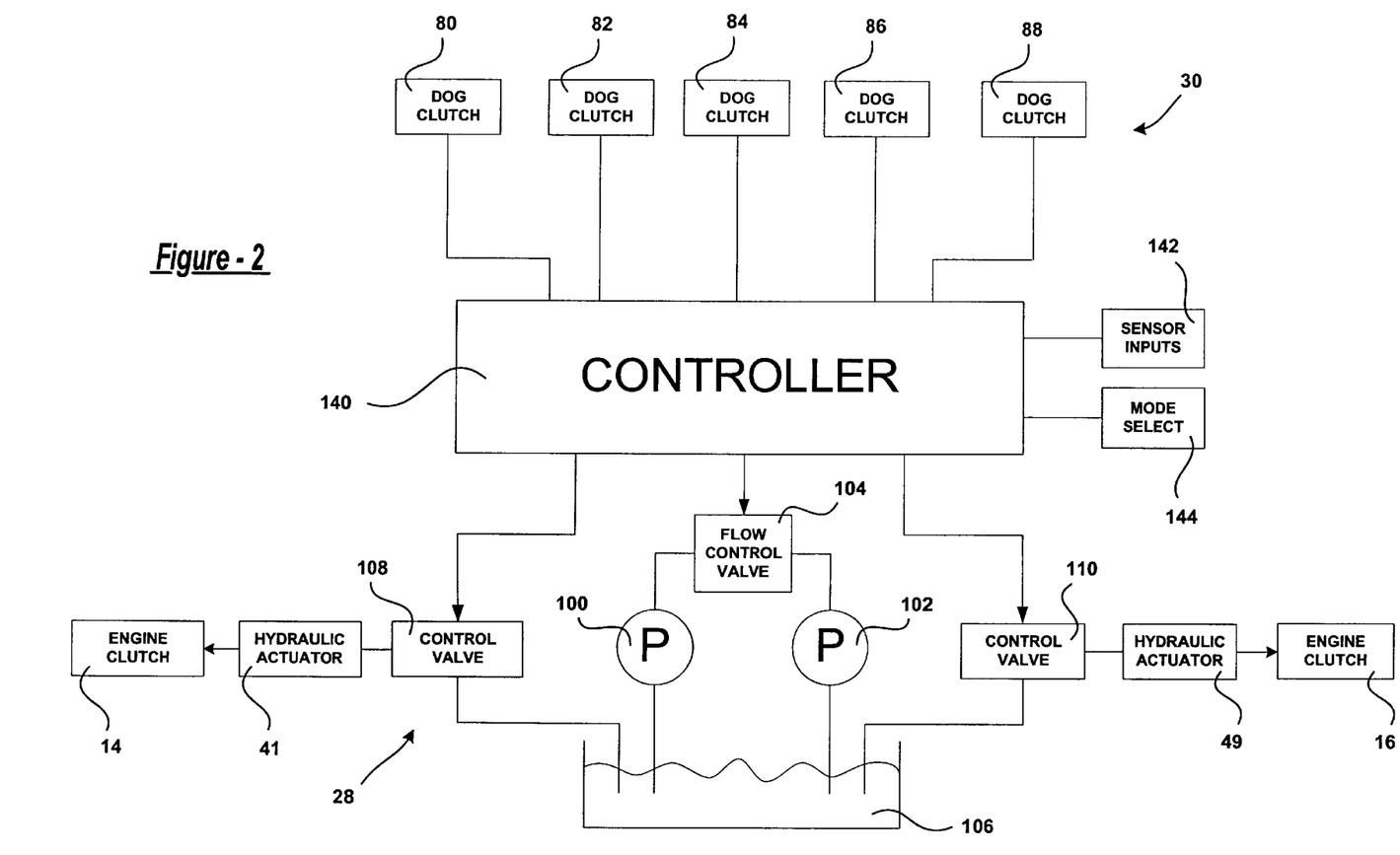
FIG. 2 is a diagrammatically illustration of the transmission control system adapted for use with the twin-clutch automated transmission shown in FIG. 1.

With reference to FIGS. 1 and 2 of the accompanying drawings, a twin-clutch automated transmission, hereinafter referred to as transaxle 10, will now be described. Transaxle 10 is driven by the output of an engine 12 and generally includes a first engine clutch 14, a second engine clutch 16, a first input shaft 18, a second input shaft 20, a split-path geartrain 22, an output shaft 24, a final drive unit 26, a clutch control system 28, and a shift control system 30.

First engine clutch 14 is a hydraulically-actuated spring-apply plate-type clutch which is normally operable in its engaged state to establish a drive connection between the output of engine 12 and a transfer shaft 32. Likewise, second engine clutch 16 is a hydraulically-actuated spring-apply plate-type clutch normally operable in its engaged state to establish a drive connection between the output of engine 12 and second input shaft 20. First engine clutch 14 includes a drive plate 34 fixed to the output of engine 12, a friction clutch plate 36 fixed to transfer shaft 32, an apply plate 38, and a spring-biased release mechanism 40 acting on apply plate 38. Release mechanism 40 is moveable to engage and release the drive connection between drive plate 34 and friction clutch plate 36. An actuator 41 is provided to control movement of release mechanism 40. Preferably, actuator 41 is a hydraulically-actuated device that controls the position of release mechanism 40 (and thus the magnitude of engagement of first engine clutch 14) in response to the fluid pressure provided thereto.

Second engine clutch 16 includes a drive plate 42 fixed to drive plate 34, a friction clutch plate 44 fixed to second input shaft 20, an apply plate 46, and a spring-biased release mechanism 48 acting on apply plate 46. Release mechanism 48 is moveable to engage and release the drive connection between drive plate 42 and friction clutch plate 44. Similarly, an actuator 49 is provided to control movement of release mechanism 48. Actuator 49 is a hydraulically-actuated device that controls the position of release mechanism 48 (and thus the magnitude of engagement of second engine clutch 16) in response to the fluid pressure provided thereto. As will be detailed, clutch control system 28 is operable to control actuators 41 and 49 and, in turn, the engagement and release of engine clutches 14 and 16. Second input shaft 20 is tubular and is concentrically supported on transfer shaft 32. As seen from the unrolled schematic view shown in FIG. 1, first input shaft 18 is offset from transfer shaft 32. However, a chain 50 meshed between a first sprocket 52 fixed to transfer shaft 32 and a second sprocket 54 fixed to first input shaft 18 provides a direct drive connection between transfer shaft 32 and first input shaft 18.

Geartrain 22 includes a first set of speed gears rotatably supported on first input shaft 18 and a second set of speed gears rotatably supported on second input shaft 20, both of which are in constant mesh with a set of output gears fixed to output shaft 24. The first set of speed gears include a first speed gear 60 which is meshed with a first output gear 62, a third speed gear 64 which is meshed with a second output gear 66, and a fifth speed gear 68 which is meshed with a third output gear 70. Similarly, the second set of speed gears includes a second speed gear 72 which is meshed with first output gear 62, a fourth speed gear 74 which is meshed with second output gear 66, and a sixth speed gear 76 which is meshed with third output gear 70. Geartrain 22 also includes a third sprocket 78 rotatably supported on output shaft 24 and which is also driven by chain 50.

Shift control system 30 includes a plurality of shift clutches which are operable for selectively coupling a selected speed gear to its corresponding input shaft for establishing six forward and one reverse speed ratio drive connections with output shaft 24. Preferably, these shift clutches are electrically-actuated dog clutches which include a first dog clutch 80 operable for selectively coupling/releasing first speed gear 60 and third speed gear 64 to/from first output shaft 18, a second dog clutch 82 operable for selectively coupling/releasing second speed gear 72 and fourth speed gear 74 to/from second output shaft 20, a third dog clutch 84 operable for selectively coupling/releasing fifth speed gear 68 to first input shaft 18. Shift control system 30 also include a fourth dog clutch 86 operable for selectively coupling/releasing sixth speed gear 76 to/from second input shaft 20, and a fifth dog clutch 88 operable for selectively coupling/releasing third sprocket 78 to/from output shaft 24. Each dog clutch includes a sliding sleeve (denoted by the suffix "A") which is splined for rotation with and axial movement on a clutch hub which, in turn, is fixed to a corresponding one of input shafts 18 and 20. As is conventional, axial movement of the sliding sleeves from the neutral uncoupled positions shown results in clutched engagement with the adjacent speed gear. Preferably, each dog clutch is of the electromagnetic type having a coil (denoted by suffix "B") adjacent to and facing a radial armature plate segment of each sliding sleeve. Electrical power delivered to the coils causes controlled axial movement of the shift sleeves. Since first clutch 80 and second clutch 82 are of the double-acting variety, a pair of coils are provided therewith. It is to be understood that any other type of power-operated device capable of moving each sliding sleeve between its uncoupled and coupled positions is within the scope of this invention.

Clutch control system 28 includes a first hydraulic pump 100 driven by first input shaft 18, a second hydraulic pump 102 driven by second input shaft 20, and flow control valving 104 interconnecting first pump 100 and second pump 102. Preferably pumps 100 and 102 are shaft-driven pumps, such as gerotor pumps, but can optionally be electrically controlled if desired. As schematically shown pumps 100 and 102 draw fluid from a sump 106 internal to transaxle 10. As best seen from FIG. 2, clutch control system 28 further includes a first electrically-actuated control valve 108 in fluid communication between actuator 41 and first pump 100, and a second electrically-actuated control valve 110 in fluid communication between actuator 49 and second pump 102. First control valve 108 is operable to deliver/vent fluid to/from a pressure chamber within which a piston associated with first actuator 41 is located. The position of this piston controls release mechanism 40 which, as noted, controls the magnitude of frictional clutch engagement between drive plate 34 and clutch plate 36, thereby controlling the drive connection between transfer shaft 32 and engine 12. Likewise, second control valve 110 is operable to deliver/vent fluid to/from a pressure chamber within which a piston associated with second actuator 49 is located. The position of this piston controls release mechanism 48 which controls the magnitude of frictional clutch engagement between drive plate 42 and clutch plate 44, thereby controlling the drive connection between second input shaft 20 and engine 12. Thus, first and second control valves 108 and 110 are capable of providing variable pressure control and, preferably, are pulse-width modulated (PWM) valves.

In operation, rotation of first input shaft 18 causes first pump 100 to draw fluid from internal sump 106 and supply high pressure fluid to first control valve 108. Likewise, rotation of second input shaft 20 causes second pump 102 to supply pressure fluid to second control valve 110. In addition, flow control valving 104 functions to regulate the transfer of high-pressure fluid between hydraulic pumps 100 and 102 such that the pump associated with the released (i.e. non-driven) one of input shafts 18 and 20 acts as a motor/brake for advancing/retarding the speed of the nondriven input shaft into speed synchronization with the uncoupled gearsets of geartrain 22 that are driven by output shaft 24. Thus, pumps 100 and 102 act as hydraulic synchronizers which function to synchronize the speed of output shaft 24 to the input shafts prior to actuation of any of the electrically-actuated dog clutches.

Geartrain 22 is shown in FIG. 1 to further include an output pinion 116 fixed to output shaft 24 which is meshed with a ring gear 118 fixed to final drive unit 26. Final drive unit 26 is a differential having a carrier 120 to which ring gear 118 is fixed, and a gearset 122 for transferring drive torque from carrier 120 to a pair of axle half-shaft 124 and 126. Gearset 122 allows speed differentiation between half-shafts 124 and 126 and carrier 120. A parking pawl wheel 130 is also fixed to output shaft 24 and can be engaged by a parking pawl 131 for releasably locking output shaft 24 to a stationary member (i.e. the housing of transaxle 10) to selectively prevent rotation of output shaft 24. Parking pawl 131 is operable to release output shaft 24 when the gearshift lever is moved out of its PARK position and lock output shaft 24 when the gearshift lever is returned to its PARK position.

In addition to the above, transaxle 10 includes a transmission controller 140 which receives various sensor input signals, denoted diagrammatically by block 142. Transmission controller 140 is an electronically-controlled unit capable of receiving data from the vehicle sensors and generating output signals in response to the sensor input signals. The input signals delivered to controller 140 can include, without limitation, engine speed, throttle position, brake status, input shaft speeds and output shaft speed. Controller 140 is operable to coordinate and monitor actuation of all the electrically-controlled devices associated with clutch control system 28 and shift control system 30, so as to permit powershifted sequential gear changes automatically without any input from the vehicle operator. As such, automated transaxle 10 is capable of being smoothly shifted without power interruption. If desired, a manually-operable mode selector switch 144 can be provided to shift transaxle 10 from its automatic shift mode to a manual shift mode. Mode switch 144 would, when actuated, allow the vehicle operator to shift the gearshift lever manually to effect sequential gear shifts (without use of a clutch pedal). However, controller 140 would only permit the selected gearshift to be completed if the current vehicle characteristics (i.e. engine speed, vehicle speed, etc.) permit completion of the requested shift.

When it is desired to operate the vehicle, engine 12 is started with the gearshift lever in its PARK position and both engine clutches 14 and 16 engaged such that both input shafts 18 and 20 are in drive connection with the output of engine 12. However, all of the electrically-actuated dog clutches are released with each shift sleeve located in its neutral uncoupled position, whereby no drive torque is delivered through geartrain 22 to output shaft 24. When the vehicle operator moves the gearshift lever from the PARK position to the DRIVE position, parking pawl 131 is released from engagement with parking wheel 130 and first engine clutch 14 is also released. In particular, controller 140 actuates first control valve 108 to move actuator 41 for releasing first engine clutch 14, whereby the drive connection between engine 12 and first input shaft 18 is released. However since second engine clutch 16 is still engaged, driven rotation of second input shaft 20 causes second pump 102 to supply pressurized fluid through flow control valving 104 to first pump 100 which then acts as a brake to stop rotation of first input shaft 18. Thereafter, first dog clutch 80 is actuated by controller 140 sending an electrical signal to coil 80B for moving sliding sleeve 80A into clutched engagement with first speed gear 60. As such, first speed gear 60 is coupled for rotation with first input shaft 18, whereby the first forward speed ratio drive connection is established between first input shaft 18 and output shaft 24. First engine clutch 14 is then gradually engaged to accelerate the vehicle.

Thereafter, when the vehicle operating parameters indicate a need to shift into the second forward gear ratio, controller 140 actuates second control valve 110 to move actuator 49 for releasing second engine clutch 16, whereby the drive connection between engine 12 and second input shaft 20 is released. Since first engine clutch 14 is engaged, first pump 100 delivers fluid to second pump 102 which then acts to retard rotation of second input shaft 20 so as to synchronize its rotary speed to that of second speed gear 72 which is driven by output gear 62 on output shaft 24. When controller 140 determines that speed synchronization is complete, second dog clutch 82 is activated by controller 140 for moving sliding sleeve 82A such that second speed gear 72 is coupled to second input shaft 20. Thereafter, controller 140 coordinates the release of first engine clutch 14 and the re-engagement of second engine clutch 16. Once first engine clutch 14 is released completely, controller 140 causes first dog clutch 80 to return sliding sleeve 80A to its neutral position for uncoupling first speed gear 60 from first input shaft 18.

To automatically establish the third forward gear ratio, driven rotation of second input shaft 20 causes second pump 102 to deliver pressurized fluid through valving 104 to first pump 100. As a result, first pump 100 causes the rotary speed of non-driven first input shaft 18 to be synchronized with that of third speed gear 64 which is driven by output gear 66 on output shaft 24. Upon completion of synchronization, controller 140 actuates first dog clutch 80 for moving sleeve 80A into clutched engagement with third speed gear 64. Thereafter, controller 140 coordinates the release of second engine clutch 16 and the engagement of first engine clutch 14. Once second engine clutch 16 is released, second dog clutch 82 is caused to return sleeve 82A to its neutral position for releasing second speed gear 72 from clutched engagement with second input shaft 20. As will be appreciated, this upshift process continues through each of the other forward speed gear ratios and likewise works in reverse for downshifts. When the gearshift lever is shifted into its REVERSE position, fifth dog clutch 88 is actuated by controller 140 for moving sleeve 88A into clutched engagement with third sprocket 78. With this powershift methodology, transaxle 10 shifts between engine clutches in a power-on shift strategy (i.e. no power interruption).

Figure 3:
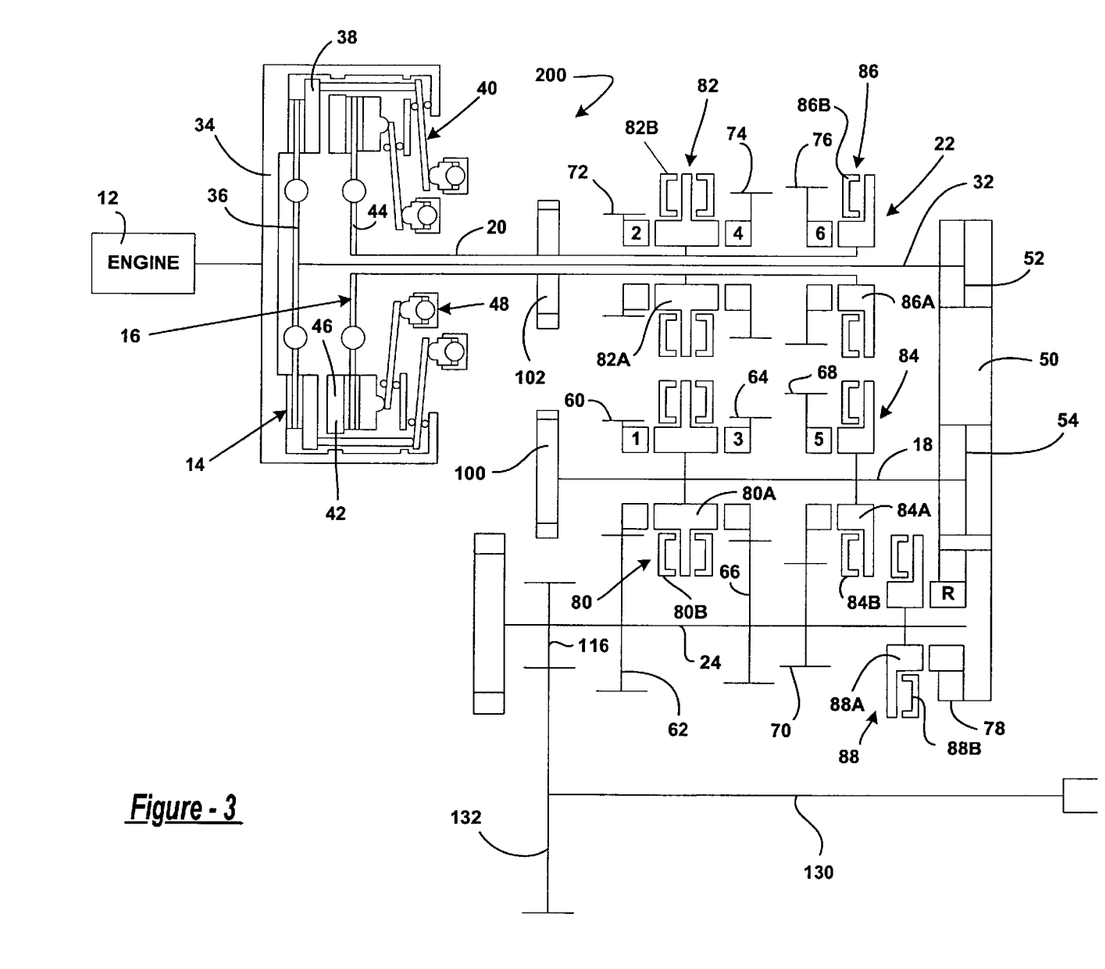
FIG. 3 is a schematic view of a twin-clutch automated transmission according to an alternative embodiment of the present invention.

Referring now to FIG. 3, a rear-wheel drive version of the automated transmission is shown and identified by reference numeral 200. As seen, final drive unit 26 and output pinion 116 have been eliminated with output shaft 24 adapted for direct connection to the rear driveline of the motor vehicle. The automatic shifting function of six-speed twin-clutch transmission 200 is identical to six-speed twin clutch transaxle 10.

Figure 4:
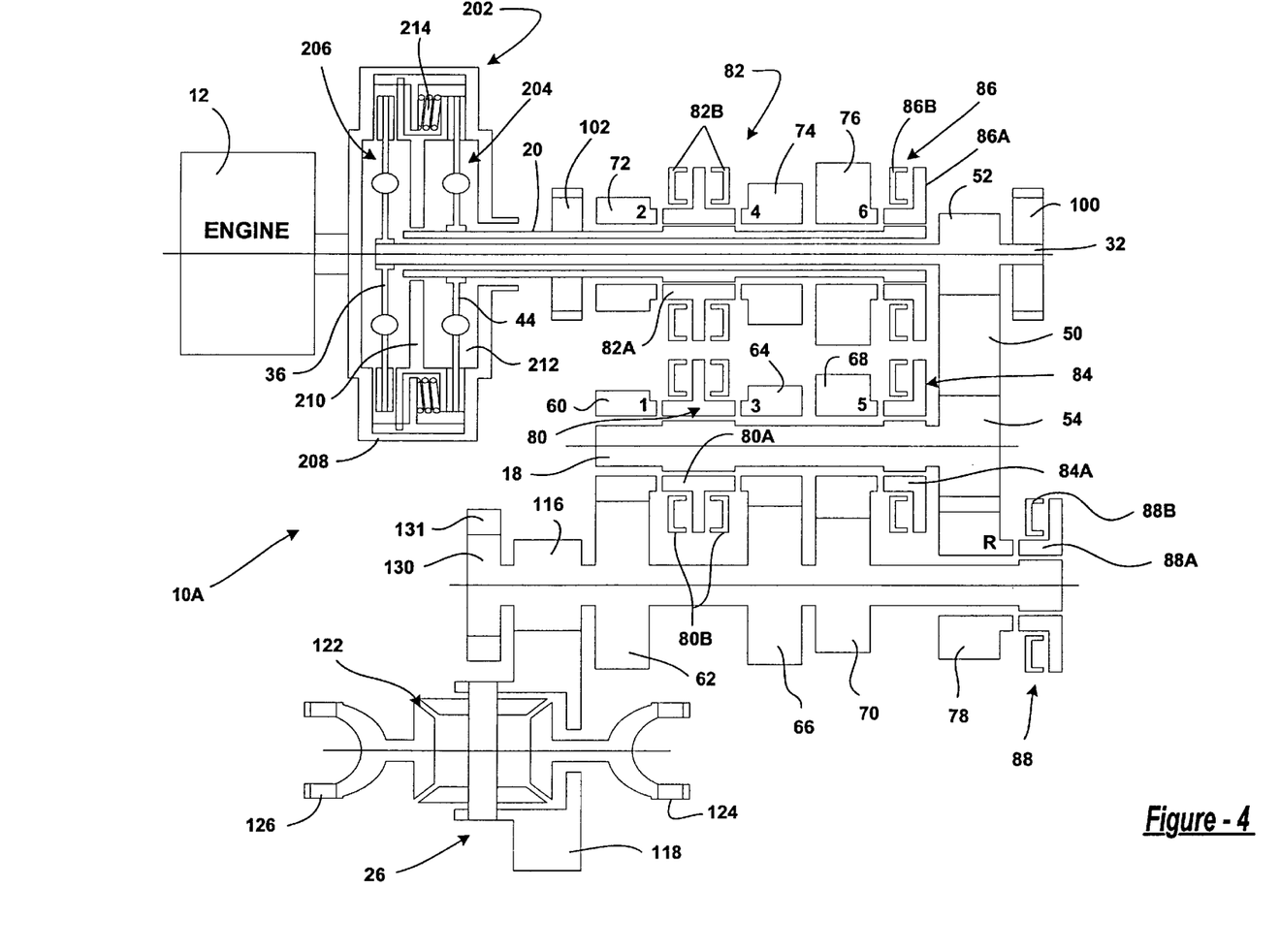
FIG. 4 is a schematic view of a twin-clutch automated transmission according to another alternative embodiment of the present invention.
Figure 5:
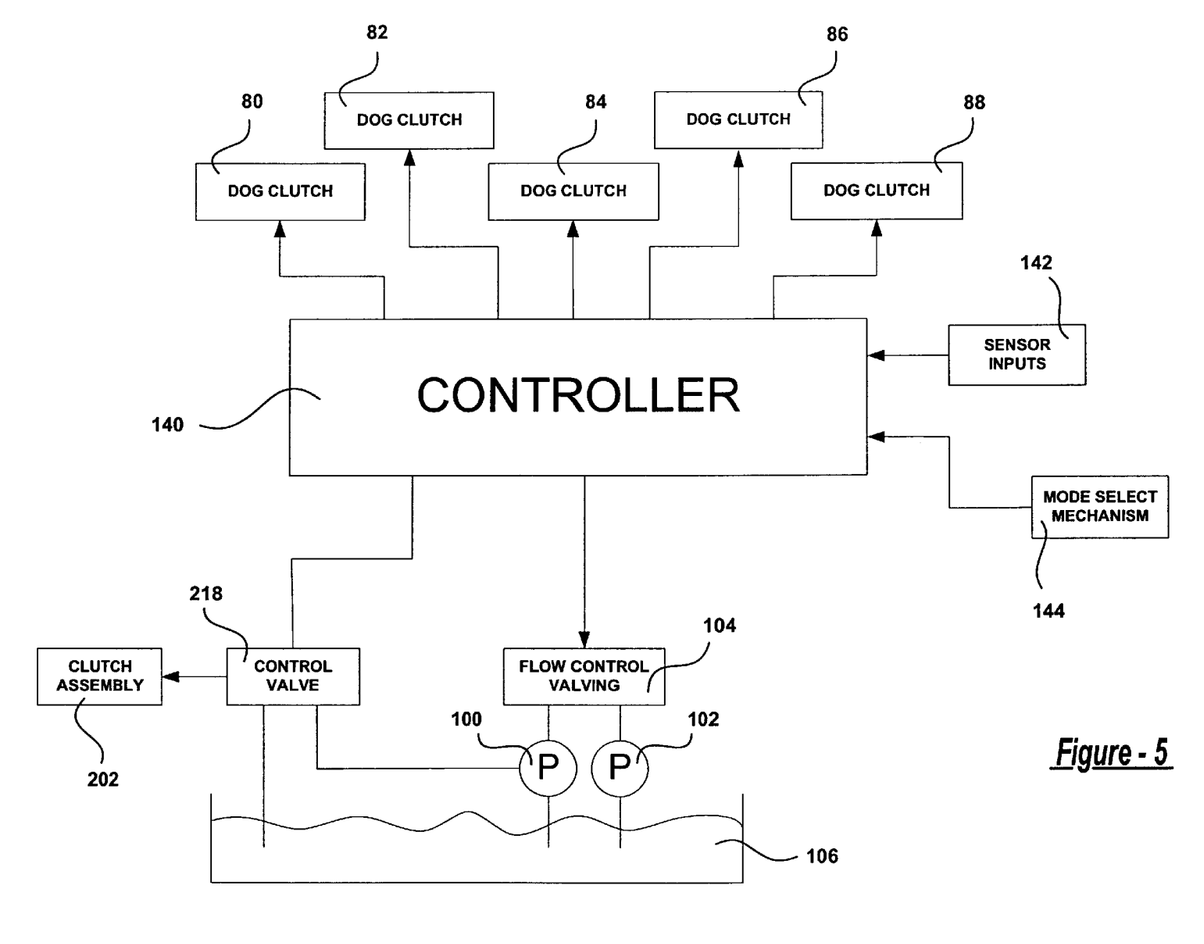
FIG. 5 is a diagram of the transmission control system adapted for use with the twin-clutch automated transmission shown in FIG. 4.

Referring now to FIGS. 4 and 5, a modified version of transaxle 10 is shown and identified by reference numeral 10A. As seen, transaxle 10A is substantially identical to transaxle 10 with the exception that first pump 100 is now connected to transfer shat 32 instead of first input shaft 18, dog clutch 88 is now shown outboard of third sprocket 78, and an engine clutch assembly 202 replaces first and second engine clutches 14 and 16.

In general, engine clutch assembly 202 includes a primary clutch 204 that is operable for selectively establishing a drive connection with second input shaft 20, and a secondary clutch 206 that is operable for selectively establishing a drive connection with transfer shaft 32. Primary clutch 204 and secondary clutch 206 are disposed within a clutch housing 208 that is fixed to the output of engine 12. A spring-loaded piston 210 normally functions to clamp friction clutch plate 44 to clutch housing 208 for establishing a spring-apply drive connection between engine 12 and second input shaft 20. Concurrently, piston 210 is displaced from engagement with friction clutch plate 36 so as to normally release transfer shaft 32 from driven connection with engine 12. However, the delivery of high pressure fluid to a pressure chamber 212 within housing functions to overcome the biasing force of spring 214 and move piston 210 to a position whereat friction plate 44 is released from frictional engagement with clutch housing 208 and friction plate 36 is frictionally clamped to clutch housing 208. As such, the drive connection between engine 12 and second input shaft 20 is released while the drive connection between engine 12 and transfer shaft 32 is established. Primary clutch 204 is arranged to drive second input shaft 20 since the highest forward gear (i.e., $6^{th}$ gear) is established by coupling speed gear 76 to second input shaft 20. Thus, the spring-apply function in $6^{th}$ gear eliminates the need for hydraulic pressure at cruise speeds, thereby reducing parasitic losses.

As shown in FIG. 5, a single control valve 218 is supplied with fluid from one of fluid pumps 120 and 122. Actuation of control valve 218 is controlled by controller 140 for selectively supplying or venting high pressure fluid to/from pressure chamber 212 so as to control actuation of engine clutch assembly 202.

What is claimed is:
1. A twin-clutch transmission for use in a motor vehicle having an engine and a driveline, comprising:
   an output shaft adapted for connection to the driveline and having an output gear fixed thereto;
   a first input shaft rotatably supporting a first speed gear meshed with said output gear;
   a first engine clutch operable for establishing a releasable drive connection between the engine and said first input shaft;
   a first shift clutch operable for releaseably coupling said first speed gear to said first input shaft to establish a drive connection between said first input shaft and said output shaft;
   a second input shaft rotatably supporting a second speed gear meshed with said output gear;
   a second engine clutch operable for establishing a releasable drive connection between the engine and said second input shaft;
   a second shift clutch operable for releasably coupling said second speed gear to said second input shaft to establish a drive connection between said second input shaft and said output shaft;
   a first fluid pump driven by said first input shaft;
   a second fluid pump driven by said second input shaft; and
   a flow path connecting said first fluid pump to said second fluid pump such that when said first engine clutch and first shaft clutch are engaged and said second engine clutch and second shift clutch are released, driven rotation of said first input shaft causes high pressure fluid to be transferred through said flow path to said second pump for synchronizing the rotary speed of said released second input shaft with that of said output shaft.

2. The twin-clutch transmission of claim 1 further comprising:
   a second output gear fixed to said output shaft;
   a third speed gear rotatably supported on said first input shaft and meshed with said second output gear; and
   a fourth speed gear rotatably supported on said second input shaft and meshed with said second output gear;
   wherein said first shift clutch is operable for releasably coupling said third speed gear to said first input shaft, and said second shift clutch is operable for releasably coupling said fourth speed gear to said second input shaft.

3. The twin-clutch transmission of claim 1 wherein the driveline is a front driveline and said output shaft drives a final drive unit including a differential and left and right front axleshafts.

4. The twin-clutch transmission of claim 1 wherein said first and second engine clutches and said first and second shift clutches are power-operated devices controlled by a transmission controller for automatically shifting between a first gear ratio established by said first speed gear and a second gear ratio established by said second speed gear.

5. The twin-clutch transmission of claim 4 wherein said first and second shift clutches are electrically-actuated dog clutches.

6. The twin-clutch transmission of claim 4 wherein said first and second engine clutches are hydraulically-actuated by first and second electronically-controlled control valves respectively supplied with fluid by said first and second fluid pumps.

7. The twin-clutch transmission of claim 1 further comprising a transfer shaft releasably driven by said first engine clutch, and a power transfer assembly coupling said transfer shaft to said first input shaft.

8. The twin-clutch transmission of claim 7 wherein said power transfer assembly includes a first sprocket fixed to said first input shaft, a second sprocket fixed to said transfer shaft, and a chain meshed with said first and second sprockets.

9. A twin-clutch transmission for use in a motor vehicle having an engine and a driveline, comprising:
   an output shaft adapted for connection to the driveline;
   a first input shaft;
   a second input shaft;
   a first engine clutch operable for establishing a releasable drive connection between the engine and said first input shaft;
   a second engine clutch operable for establishing a releasable drive connection between the engine and said second input shaft;
   a geartrain including first and second output gears fixed to said output shaft, a first speed gear supported on said first input shaft and meshed with said first output gear, a second speed gear supported on said second input shaft and meshed with said first output gear, a third speed gear supported on said first input shaft and meshed with said second output gear, and a fourth speed gear supported on said second input shaft and meshed with said second output gear;
   a first shift clutch operable for releasable coupling said first and third speed gears to said first input shaft;
   a second shift clutch operable for releasably coupling said second and fourth speed gears to said second input shaft;
   a first fluid pump driven by said first input shaft;

a second fluid pump driven by said second input shaft;

a control valve permitting fluid flow between said first and second fluid pumps; and a transmission control system for controlling coordinated actuation of said first and second engine clutches to cause powershift sequential gear shifts, such that when one of said first and second input shafts is released from driven connection with the engine, said fluid pump associated with the driven one of said first and second input shafts supplies high pressure fluid through said control valving to said fluid pump associated with the released one of said first and second input shafts to synchronize the rotary speed of the released one of said first and second input shaft to said output shaft.

10. The twin-clutch transmission of claim 9 wherein the driveline is a front driveline and said output shaft drives a final drive unit including a differential and left and right front axleshafts.

11. The twin-clutch transmission of claim 9 wherein said first and second engine clutches and said first and second shift clutches are power-operated devices controlled by a transmission controller for automatically shifting between a first gear ratio established by said first speed gear, a second gear ratio established by said second speed gear, a third gear ratio established by said third speed gear, and a fourth gear ratio established by said fourth speed gear.

12. The twin-clutch transmission of claim 11 wherein said first and second shift clutches are electrically-actuated dog clutches.

13. The twin-clutch transmission of claim 11 wherein said first and second engine clutches are hydraulically-actuated by first and second control valves controlled by said transmission controller and which are supplied with high pressure fluid by said first and second fluid pumps.

14. An automated twin-clutch transmission adapted to transfer power from the engine to a driveline of a motor vehicle, comprising:

a first engine clutch operable to establish a releasable drive connection between the engine and a first input shaft;

a second engine clutch operable to establish a releasable drive connection between the engine and a second input shaft;

an output shaft adapted to transfer power to the driveline;

first and second constant-mesh gearsets interconnecting said first and second input shafts to said output shaft;

first and second power-operated dog clutches for selecting engaging said first and second gearsets;

a transmission controller for controlling coordinated actuation of said first and second engine clutches and said first and second dog clutches; and a clutch control system including a first hydraulic pump driven by said first input shaft for delivering high pressure fluid to a first control valve for selectively releasing said first engine clutch, a second hydraulic pump driven by said second input shaft for delivering high pressure fluid to a second control valve for selectively releasing said second engine clutch, and flow control valving for controlling fluid flow between said first and second fluid pumps in response to release of the drive connection between one of said first and second input shafts and the engine.

15. The automated twin-clutch transmission of claim 14 wherein when said first engine clutch and said first dog clutch are engaged and said second engine clutch and said second dog clutch are released, driven rotation of said first input shaft cause fluid to be transferred from said first fluid pump to said second fluid pump which acts to modify the rotary speed of said second input shaft to match with the rotary speed of said output shaft.

16. The automated twin-clutch transmission of claim 14 wherein said first and second dog clutches are electronically-actuated dog clutches.

17. The automated twin-clutch transmission of claim 14 wherein said first and second engine clutches are hydraulically-actuated by first and second electrically-actuated control valves that are supplied with high pressure fluid by said first and second fluid pumps.

18. The automated twin-clutch transmission of claim 14 further comprising a transfer shaft releasably driven by said first engine clutch, and a power transfer assembly coupling said transfer shaft to said first input shaft, said transfer shaft coaxially supporting said second input shaft.

* * * * *